United States Patent [19]

Sacripante et al.

[11] Patent Number: 6,025,412
[45] Date of Patent: *Feb. 15, 2000

[54] COLORED PARTICULATES FOR INK JET INKS

[75] Inventors: Guerino G. Sacripante, Oakville; Marcel P. Breton, Mississauga, both of Canada

[73] Assignee: Xerox Corporation, Stamford, Conn.

[*] Notice: This patent is subject to a terminal disclaimer.

[21] Appl. No.: 08/536,237

[22] Filed: Sep. 29, 1995

[51] Int. Cl.$^7$ ..................................................... C09D 11/10
[52] U.S. Cl. .......................... 523/161; 524/458; 524/460; 260/DIG. 38; 106/31.27; 106/31.28; 106/31.48
[58] Field of Search ................................ 106/20 D, 21 D, 106/23 R, 22 R; 523/161; 524/715, 458, 460; 260/DIG. 38

[56] References Cited

U.S. PATENT DOCUMENTS

| | | | |
|---|---|---|---|
| 4,074,284 | 2/1978 | Dexter et al. | 346/140 R |
| 4,183,031 | 1/1980 | Kyser et al. | 346/140 R |
| 4,375,357 | 3/1983 | Wingard et al. | 8/647 |
| 4,471,079 | 9/1984 | Enami | 523/161 |
| 4,627,875 | 12/1986 | Kobayashi et al. | 106/22 |
| 4,737,190 | 4/1988 | Shimada et al. | 106/22 |
| 4,855,344 | 8/1989 | Nealy et al. | 524/86 |
| 5,156,675 | 10/1992 | Breton et al. | 106/22 |
| 5,169,437 | 12/1992 | You | 106/20 D |
| 5,207,824 | 5/1993 | Moffatt et al. | 106/22 R |
| 5,230,733 | 7/1993 | Pawlaski | 106/22 R |
| 5,281,630 | 1/1994 | Salsman | 521/48.5 |
| 5,310,887 | 5/1994 | Moore et al. | 534/729 |
| 5,364,462 | 11/1994 | Crystal et al. | 106/22 R |
| 5,369,210 | 11/1994 | George et al. | 528/293 |

OTHER PUBLICATIONS

Sulfo Polyesters: New Resins for Water Based Intks . . . Kenneth R. Barton, Oct. 1993.
K.R. Barton, "Sulfopolyesters: New Resins For Water–ased Inks, Overprint Lacquers, and Primers," American Ink Maker, Oct. 1993, pp. 70–72.

*Primary Examiner*—Marion McCamish
*Assistant Examiner*—John J. Guarriello
*Attorney, Agent, or Firm*—Oliff & Berridge, PLC

[57] ABSTRACT

An ink for ink jet printing includes particles of an emulsifiable dye-polymer resin dispersed in a liquid vehicle, wherein the emulsifiable dye-polymer resin includes a dye chemically attached to the polymer resin. The polymer resin contains a base chain, such as polyester, having attached thereto hydrophilic groups, such as alkali sulfonated groups, for emulsifying the resin in water. The dye may be attached within the base chain itself, or attached to the base chain as a side chain component.

18 Claims, No Drawings

COLORED PARTICULATES FOR INK JET INKS

BACKGROUND OF THE INVENTION

This invention relates to improved waterfast inks for use in ink jet printing processes. More particularly, this invention relates to ink jet inks having excellent waterfastness and print quality characteristics that can be used in various printing processes such as thermal ink jet and acoustic ink jet processes.

Ink jet printing processes and apparatus for such processes are well known in the art. Two major types of ink jet processes are thermal ink jet and acoustic or piezoelectric ink jet processes.

In thermal ink jet printing processes, the printer typically employs a resistor element in a chamber provided with an opening for ink to enter from a plenum. The plenum is connected to a reservoir for storing the ink. A plurality of such resistor elements is generally arranged in a particular pattern, called a primitive, in a printhead. Each resistor element is associated with a nozzle in a nozzle plate, through which ink is expelled toward a print medium, such as paper. The entire assembly of printhead and reservoirs comprises an ink jet pen. In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alpha numeric characters, performs area-fill, and provides other print capabilities on the medium. The thermal ink jet printing process is described in more detail, for example, in U.S. Pat. Nos. 5,169,437 to You and 5,207,824 to Moffatt et al., the entire disclosures of which are incorporated herein by reference.

In an acoustic or piezoelectric ink jet system, ink droplets are propelled to the recording medium by means of a piezoelectric oscillator. In such a system, a recording signal is applied to a recording head containing the piezoelectric oscillator, causing droplets of the ink to be generated and subsequently expelled through the printhead in response to the recording signal to generate an image on the recording medium. In this printing system, a recording signal is converted into a pulse by a signal processing means such as a pulse converter and then applied to the piezoelectric oscillator. A change in pressure on the ink within an ink chamber in the printhead caused by the recording signal results in droplets of ink being ejected through an orifice to a recording medium. Such an ink jet system is described in more detail, for example, in U.S. Pat. No. 4,627,875 to Kobayashi et al., the entire disclosure of which is incorporated herein by reference.

In these and other ink jet recording processes, it is necessary that the ink being used meet various stringent performance characteristics. Such performance characteristics are generally more stringent than those for other liquid ink applications, such as for writing instruments (e.g., a fountain pen, felt pen, etc.). In particular, the following conditions are generally required for inks utilized in ink jet printing processes:

(1) the ink should possess liquid properties such as viscosity, surface tension and electric conductivity matching the discharging conditions of the printing apparatus, such as the driving voltage and driving frequency of a piezoelectric electric oscillator, the form and material of printhead orifices, the diameter of orifices, etc.

(2) the ink should be capable of being stored for a long period of time without causing clogging of printhead orifices during use.

(3) the recording liquid should be quickly fixable onto recording media, such as paper, film, etc., such that the outlines of the resulting ink dots are smooth and there is minimal blotting of the dotted ink.

(4) the resultant ink image should be of high quality, such as having a clear color tone and high density. The ink image should also have high gloss and high color gamut.

(5) the resultant ink image should exhibit excellent waterfastness (water resistance) and lightfastness (light resistance).

(6) the ink should not chemically attack, corrode or erode surrounding materials such as the ink storage container, printhead components, orifices, etc.

(7) the ink should not have an unpleasant odor and should not be toxic or inflammable.

(8) the ink should exhibit low foaming and high pH stability characteristics.

Various inks for ink jet printing processes are known in the art. For example, various ink jet inks are disclosed in U.S. Pat. Nos. 4,737,190 to Shimada et al. and 5,156,675 to Breton et al. Generally, the ink jet inks of the prior art are aqueous inks, comprising a major amount of water, a humectant and/or a co-solvent, and a dye. By selecting specific humectants, dyes, or other components, it is possible to adjust the print characteristics of the resultant ink.

U.S. Pat. No. 5,364,462 to Crystal et al. describes dye-based inks that are described as providing improved stability, jetting characteristics, solubility and waterfastness. The aqueous dye-based ink includes a dye and a hydroxyethylated polyethylene imine polymer. The hydroxyethylated polyethylene imine polymer may also be substituted with hydroxypropylated polyethylene imine or epichlorohydrin-modified polyethylene imine polymers. Aprotic solvents, such as dimethyl sulfoxide and tetramethylene sulfone may also be added to the ink to improve the solubility and stability of the dye solution.

Sulfopolyester resins are known and are generally available commercially from Eastek Inks, a business unit of Eastman Chemical Company. These sulfopolyester resins are suitable for use in water-based inks, overprint lacquers and primers, as described in Kenneth R. Barton, "Sulfopolyesters: New Resins for Water-Based Inks, Overprint Lacquers and Primers," *American Ink Maker*, pp. 70–72 (October, 1993). The sulfopolyester resins may be prepared by the polycondensation reaction of selected dicarboxylic acids, glycols and sodio sulfoorganodicarboxylic acids or glycols to produce linear structures.

Although numerous ink jet inks are presently available, they generally do not meet all of the above-described requirements, while also providing excellent print quality on plain paper. In particular, the inks generally used in ink jet printing processes, while producing acceptable print quality, do not produce the high print quality that is achieved by using dry toner compositions, such as in electrostatographic imaging processes.

The need continues to exist in the ink jet industry for improved ink jet inks that satisfy the above-described requirements while providing high quality prints on a wide variety of recording media, including plain paper. Although some currently available ink jet inks may provide waterfast images with better substrate latitude, the inks are unacceptable in that they generally smear and have poor latency and maintainability characteristics. In addition, such inks are generally difficult to manufacture. Thus, there is still a need in the ink jet ink industry for improved black and colored inks that can be easily prepared and obtained at a lower cost.

SUMMARY OF THE INVENTION

The present invention provides ink jet ink compositions that have excellent waterfastness and high print quality on a wide variety of print media, including paper and transparencies. The ink compositions also meet various end-user requirements described above, including wide color gamut, high gloss, lightfastness, high stability, improved drying time and reduced odor retention and toxicity while being compatible with the ink jet printing environment and apparatus. The ink jet ink compositions of the present invention also provide significantly improved print quality on plain paper, as compared to other ink compositions. Significantly, the present invention provides for improved print quality of the ink by ensuring that there is less free colorant material (i.e., dyes unbound to the polymer chain) that would penetrate further into the print media to reduce print quality and give rise to intercolor bleeding properties. A higher loading of colorant in the ink than was previously possible is also provided in the present invention.

The present invention provides an improved ink composition formulated by chemically incorporating a dye into an emulsifiable polymeric resin. That is, the present invention provides a polymer resin containing a dye that when in contact with a liquid, especially water, emulsifies to small sized particles of from about 2 nanometers to about 500 nanometers, and preferably less than about 100 nanometers, in diameter. Such polymer resin also contains an ionic group such as an alkali sulfonate moiety in an amount of from about 2.5 to about 10 mole percent of the polymer resin, necessary to achieve the emulsifiable properties. Improved print quality may be achieved by chemically bonding the dye into the polymer, such that the dye molecule does not penetrate further into the print media to reduce print quality, and/or cause intercolor bleed with other colors during the drying step of the penetrated image after the image formation step.

In the present invention, the dye is chemically attached to the emulsifiable polymer resin, as either a main chain constituent or a side chain constituent, rather than being separately mixed with a polymer resin. This invention thus allows for the production, for example, of a base set of colored ink jet inks, which may then be mixed in appropriate proportions to produce a final ink jet ink composition of any given color.

Specifically, this invention provides an ink for ink jet printing, comprising colored particles of an emulsifiable dye-polymer resin dispersed in a liquid vehicle, said polymer resin comprising a dye chemically attached to the polymer resin.

The present invention thus provides ink jet ink compositions containing colored particles having a number average particle size of from about 2 nm to about 500 nm, wherein the colored particles comprise a polymeric resin containing a dye chemically attached to said resin.

DETAILED DESCRIPTION OF PREFERRED EMBODIMENTS

The ink jet ink compositions of the present invention generally comprise colored particles dispersed in a liquid vehicle, the particulates comprising a polymer resin and a dye, with the dye and one or more hydrophillic moieties chemically attached to the polymer resin to form an emulsifiable dye-polymer resin. The colored particulates may be obtained by emulsifying a dye-polymer resin to a submicron size regime by heating the resin to above its glass transition temperature, in a solvent such as water. In the present invention, the polymer resin preferably includes a base resin (polymer chain) with hydrophilic groups such as alkali sulfonated moieties attached thereto. Dyes are also attached to the polymer, and may also be incorporated into the base resin chain. The hydrophilic groups in the polymer control the emulsifying characteristics of the resin, and render the polymer resin emulsifiable in a solvent such as water.

For use in the ink jet inks of the present invention, the base resin of the emulsifiable polymer resin may include any suitable polymers, such as polyamides, polyimides, poly (meth)acrylate, polystyrene, copolystyrene-copoly(meth) acrylate, polyester, mixtures thereof and the like. Preferably, the base resin of the dye-polymer resin comprises polyester or polystyrene. Other known resins may be used for the base resin of the emulsifiable polymer resin in embodiments of the present invention, so long as the objects of the present invention are achieved and the above-described conditions for ink jet printing are satisfied. In particular, the base resin for use in the emulsifiable polymer resin of inks of the present invention is selected to meet three requirements: (1) the resin must be compatible with co-solvents used in the inks; (2) the resin must be sufficiently thermally stable to avoid decomposition of the polymer resin on heaters used in the printhead ejectors, for example to prevent kogation and poor heater efficiency; and (3) the resin must be stable with respect to possible hydrolysis of the polymers used in the ink. Furthermore, the base resin used in the emulsifiable polymer resin of the present invention must not be soluble, without the hydrophilic groups, in the aqueous medium used for the ink.

The colored particles used in the ink jet inks of the present invention preferably include a hydrophilic group attached to the base resin polymer chain. The hydrophilic group is included to render the dye-polymer resin emulsifiable in water or another solvent. Any suitable hydrophilic group may be attached to the base resin polymer chain to render the resultant polymer emulsifiable in a solvent, so long as the objects of the present invention are achieved. Examples of suitable hydrophilic groups include, but are not limited to, carboxylic acid alkali salts, phosphonate salts, ammonium halides, alkali sulfonated groups, mixtures thereof and the like. Preferably, the hydrophilic group attached to the base resin polymer chain is an alkali sulfonated group with an alkali metal counterion such as sodium, calcium, lithium, potassium, cesium, barium, magnesium, hydrogen, mixtures thereof and the like.

In the present invention, the final particle size (average diameter) of the dye-polymer compound may generally be controlled by adjusting the concentration of hydrophilic groups attached to the base resin polymer chain. For example, as the concentration of hydrophilic groups increases, the dye-polymer resin emulsifies to smaller sized particles; and at high enough concentration of hydrophilic groups, for example greater than 10 mole percent of the resin, the resin becomes soluble in the liquid. In contrast, as the concentration of hydrophilic groups decreases, the dye-polymer resin increases in particle size when emulsified in the liquid; and if the concentration of the hydrophillic group is to low, for example less than 2.5 mole percent of the resin, the corresponding partcles may have a particle size greater than 500 nanometers and may not be useful as an ink component. Therefore, if the concentration of the hydrophilic groups becomes too high or too low, the ability of the emulsifiable dye-polymer resin to self-emulsify to submicron particle sizes of from about 2 nanometers to about 500 nanometers is decreased. Accordingly, in the dye-polymer resin of the present invention, hydrophilic groups are attached to the base resin polymer chain in an amount sufficient to enable the dye-polymer resin to self-emulsify to a desired submicron particle size. Preferably, the concentration of hydrophilic groups is from about 2.5 mole % to about 15 mole % of the resin, and more preferably is from about 5% to about 10 mole % of the resin.

In embodiments of the present invention, the dye-polymer resin is preferably a polyester derived from a diol and a diester. In a preferred emulsifiable polymer resin, the resin comprises about 50 mole percent of a diol such as a dihydroxy functional dye molecule, alkylene glycol, and/or oxyalkylene glycol. By dihydroxy functional dye is meant a dye molecule with two hydroxyl moieties. A mixture of dihydroxy functional dye and an alkylene glycol or oxyalkylene glycol may also be used. In preferred embodiments, the total amount of diol is about 50 mole percent of the resin, wherein the dihydroxy functional dye is contained as at least 20 mole percent of the resin with the remaining portion being an organic diol of from about 0 to about 30 mole percent of the resin. The diester component in the preferred polymer resin is preferably a mixture of from about 2.5 to about 15 mole percent of sulfonated aromatic moiety, preferably a sodium sulfonated aromatic moiety such as dimethyl 5-sulfoisophthalate sodium salt, and the remaining portion is from about 35 to about 47.5 mole percent of a diester such as dimethyl terephthalate, dimethyl naphthalenedicarboxylate, dimethyl isophthalate, alkylenediester, mixtures thereof and the like. The dye polyester resin of this embodiment has the following general formula (I):

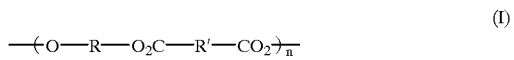

(I)

wherein R' is a mixture of from about 35 to about 47.5 mole percent (of the polymer) of moieties selected from alkylenes such as ethylene, propylene, butylene, pentylene, octylene, and the like; phenylene; ethenylene; terephthalylene; isophthalylene; cyclohexylene; bisphenolene; bis(alkyloxy) bisphenolene; derivatives thereof; mixtures thereof and the like and from about 2.5 to about 15 mole percent of an alkali sulfonate moiety such as sodium sulfonated, calcium sulfonated, or lithium sulfonated derivatives of ethylene, propylene, butylene, pentylene, octylene, phenylene, terephthalylene, isophthalylene, ethenylene, cyclohexylene, bisphenolene, bis(alkyloxy) bisphenolene, and the like; R is a mixture of from about 20 to about 50 mole percent of a dye chromophore, and from about 0 to about 30 mole percent of an alkyl group, an oxyalkylene group, bisphenylene, cyclohexylene, mixtures thereof and the likes; and n is an integer of from about 10 to about 1000. More preferably, n is an integer of from about 10 to about 100.

In embodiments, it is further preferred that the diol component of the above emulsifiable polymer resin of formula (I) comprises at least two separate diol components, one being a chromophore of a dye having two functional hydroxy groups, generally represented as formula (II):

HO—Chromophore—OH (II)

and the other being an aliphatic diol such as an alkylene glycol or oxyalkylene glycol. In this embodiment, the dye (chromophore) is chemically bonded into the base chain of the polymer resin.

In other embodiments of the present invention, where the polymer resin is other than a polyester, it is still preferred that the dye be in the form of a chromophore incorporated into the polymer resin. In such embodiments, the dye may be included in any effective and desired amount to impart the desired color to the resultant ink composition.

In embodiments of the present invention, the emulsifiable dye-polymer resin has a glass transition temperature of from about 10° to about 100° C. More preferably the emulsifiable polymer resin has a glass transition temperature of from about 20° C. to about 80° C., and even more preferably of from about 35° C. to about 80° C. The emulsification of the dye-polymer is usually accomplished at a temperature above its glass transition temperature in the liquid media. Hence, if the glass transition temperature of the dye-polymer is above 100 ° C., then the dye-polymer may not self emulsify in water at atmospheric pressures. Conversly, if the glass transition temperature of the dye-polymer is too low, then the resultant print media may become very sticky.

Various methods for producing such emulsifiable dye-polymer resins are known in the art, and will be apparent to one skilled in the art based on the instant disclosure. For example, sulfonated polyester resins are available from Eastek Inks, a business unit of Eastman Chemical Company, as the Sulfopolyester Series 1000, 1100, 1200 and 2100 products. Such sulfopolyester resins, and the method for production thereof, are described, for example, in Kenneth R. Barton, "Sulfopolyesters: New Resins for Water-Based Inks, Overprint Lacquers and Primers," *American Ink Maker*, pp. 70–72 (October, 1993), the entire disclosure of which is incorporated herein by reference. The disclosed process may be adjusted as necessary, in accordance with the present invention, to provide suitable emulsifiable polyester resins.

Because the dye in the present invention is incorporated directly into the polymer resin, it is preferred that the dye be introduced into the polymer resin during the initial formation of the resin. For example, it is preferred that the dye be added into the starting components prior to the initial polymerization of the dye-polymer resin. However, as will be evident to one skilled in the art, the dye can be introduced into the polymer resin, for example as a side chain component, after the base polymer resin chain is formed.

Generally, the colorant material in the ink jet inks of the present invention is only a dye, although a combination of dyes and pigments may be used in some embodiments.

Any suitable commercially available dye may be used to impart the desired color characteristics to ink jet inks of the present invention. In embodiments, preferred dyes are the anionic dyes, cationic dyes, reactive dyes, and alcohol- and oil-soluble dyes Fluorescent dyes can also be used in the ink jet ink compositions of the present invention. Specific examples of such dyes include Bernacid Red 2BMN, Pontamine Brilliant Bond Blue A, BASF X-34, Pontamine, Food Black 2, Carodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz), Carodirect Yellow RL (Direct Yellow 86, Carolina Color and Chemical), Cartasol Yellow GTF Liquid Special 110 (Sandoz, Inc.), D&C Yellow#10 (Acid Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX4GD, Procion Blue MX-G, and Procion Blue MX-2GN, all available from ICI; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Acid Yellow 17, Acid Red 52, and Direct Red 227, all available from Tricon; Projet Cyan 1, Projet Magenta 17, and Projet Yellow 1G, all available from Zeneca; mixtures thereof, and the like. Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benzimidazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl) stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable.

In embodiments, the dye is in the form of a chromophore having two or more —OH groups, as described above. The presence of the —OH groups permits the dye to be chemically bonded into the base chain of the polymer resin as a diol component to form a polyester base-chain. However, any method of bonding the dye to the polymer resin, as either a base or side chain component or by having two diester or dicarboxylic acid components instead of the hydroxyl component, may be used in embodiments of the present invention. For example, if the dye has two diester functionalities, it can be polymerized onto a polyester resin by condensation with an appropriate organic diol, and sulfonated monomer. Other mechanisms and structures will be apparent to one skilled in the art based on the instant disclosure.

Other suitable dyes for use in the present invention include polyoxyalkylene substituted organic chromophores. Examples of such dyes are those having the following formula (III):

$$A\text{-}(Y)_p \hspace{2cm} (III)$$

where A is an organic chromophore, Y is a straight chain or branched polyoxyalkylene substituent comprised of from 1 to about 200 radicals of $C_2$ to $C_{18}$ alkylene oxides, and p represents the number of polyoxyalkylene oxide chains per chromophore and may be from 1 to 6, preferably 1 to 4. For example, two polyoxyalkylene substituents may be bonded to the chromophore through a trivalent linking group. The chromophore is generally covalently bonded to the polyoxyalkylene substituent by a linking group such as N, $NR^3$, O, S, $SO_2$, $SO_2N$, $SO_2NR^3$, $CO_2$, CON, or $CONR^3$, where $R^3$ is H, $C_1$ to $C_{12}$ alkyl, phenyl or benzyl. These dyes may also be represented generally by the formula (IV):

$$A\text{-}(Y\text{-}X\text{-}C(O)\text{-}R^1\text{-}C(O)OH)_p \hspace{1cm} (IV)$$

where A is an organic chromophore; Y is a polyoxyalkylene substituent having from 1 to about 200 radicals of $C_2$ to $C_{18}$ alkylene oxides; p is an integer from 1 to 6; X is a nucleophile selected from 0, $NR^2$ and S, where $R^2$ is H or a $C_1$ to $C_{18}$ alkyl; $R^1$ is selected from alkylene, alkenylene, phenylene and phenylenealkylene, any of which may be optionally substituted with alkyl, alkenyl or aryl groups, provided that the total number of carbon atoms is from 2 to 30. The dyes are described in more detail in U.S. Pat. No. 5,310,887, the entire disclosure of which is incorporated herein by reference.

The dye may be chemically bonded to the polymer resin in the ink jet ink compositions of the present invention in any effective amount to impart the desired colorant properties to the ink. Typically, the polymer resin comprises from about 20 to about 50 mole percent dye residue by weight of the polymer resin. Preferably, the polymer resin contains from about 30 to about 50 mole percent, and more preferably from about 40 to about 50 mole percent dye residue by weight of the polymer resin. However, an amount of dye, or a combination of dye and pigment, outside of these ranges is permissible as long as the objects of the invention are achieved. A mixture of colorants in the proportions desired to obtain a specific shade may also be employed.

The ink jet ink compositions of the present invention may generally be prepared by preparing the emulsifiable dye-polymer resin, and dispersing it with other optional ink components in an ink vehicle to produce an ink jet ink composition. As referred to herein, "dye-polymer resin" is used to refer to the product resulting from the dye being chemically bonded into the-polymer resin, as either a main chain or side chain constituent. The final ink composition is generally produced by heating the mixture in water and/or another solvent to emulsify the dye-polymer resin to the desired ink particle size.

The dye-polymer resin is emulsified in a suitable solvent to produce the final ink jet ink composition. In this step, the dye-polymer resin is heated at a temperature above its glass transition temperature in a suitable solvent, such as water and/or a co-solvent, to emulsify the resin, thereby producing colored particulates having a desired particle size suitable for ink jet ink applications. Generally, in embodiments, the ink jet ink composition is prepared by heating from about 2 to about 20% by weight of the dye-polymer resin in the solvent, at a temperature above the glass transition temperature of the dye polymer resin.

The result is a stable, homogeneous ink jet ink composition containing colored particulates having a number average particle size of from about 2 nm to about 500 nm, wherein the colored particulates comprise dye bonded to a polymer resin. Preferably, the particle size of the colored particles in the ink jet ink composition is from about 5 nm to about 100 nm, and even more preferably from about 5 nm to about 75 nm.

The liquid vehicle of the inks of the present invention may consist of water, or a co-solvent may also be added to the water vehicle, if desired. In embodiments of the present invention, however, it is preferred that water be used alone as the solvent in the ink vehicle. This allows for the preparation of cosolvent-less inks, which are more environmentally friendly. The use of one or more co-solvents is therefore optional.

When a co-solvent is used, it is preferred that the co-solvent is a miscible organic component. Examples of suitable co-solvents include, but are not limited to, ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones such as sulfolane, alcohol derivatives, carbitol, butyl carbitol, cellusolve, ether derivatives, amino alcohols, ketones, N-methylpyrrolidinone, 2-pyrrolidone, cyclohexylpyrrolidone, hydroxyethers, amides, sulfoxides such as dimethyl sulfoxide, lactones, mixtures thereof and the like.

When mixtures of water and one or more co-solvents are selected as the liquid vehicle, the ratio of water to co-solvent may be in any effective range. Typically the ratio of water to co-solvent is from about 100:0 to about 30:70, preferably from about 97:3 to about 50:50, although the ratio can be outside these ranges. The non-water component of the liquid vehicle, when present, generally serves as a humectant, which typically has a boiling point higher than that of water.

Humectants may also be added to the inks of the present invention. For example, suitable humectants include, but are not limited to, glycols, N-methyl-pyrrolidone, 2-pyrrolidone, N-methyl-2-pyrrolidone, 1,2,-dimethyl-2-imidazolidinone, mixtures thereof and the like. Humectants may be included in the ink to prevent water evaporation and sedimentation. Additionally, certain humectants such as N-methyl-pyrrolidone and 2-pyrrolidone have been found to improve solubility in the ink and thus serve the dual role as humectant and co-solvent. In addition, some humectants such as 2-pyrrolidone have been found to resist ink build-up on jet faces during extended printing, which is preferred for cartridge refillability. When incorporated into the inks of the present invention, approximately 1 to 10 percent of one or more humectants by weight may be added to the ink to prevent sediment build-up on print heads.

Other components may also be incorporated into the inks of the present invention. For example, inks of the present invention may include such additives as biocides, buffering agents, anti-mold agents, pH adjustment agents, electric conductivity adjustment agents, chelating agents, anti-rusting agents, and the like. Such additives may be included in the ink jet inks of the present invention in any effective amount, as desired. For example, such additives may be included in an amount ranging from about 0.0001 to about 4.0 percent by weight, and preferably from about 0.01 to about 2.0 percent by weight of the ink. More preferably, such additives may be included in an amount ranging from about 0.01 to about 0.5 percent by weight of the ink and most preferably from about 0.05 to about 0.3 percent by weight. The amount included will depend, of course, on the specific component being included.

Examples of buffering agents include, but are not limited to, agents such as sodium borate, sodium hydrogen phosphate, sodium dihydrogen phosphate, mixtures thereof and the like. Examples of biocides include, but are not limited to, Dowicil™ 150, 200, and 75; benzoate salts; sorbate salts; mixtures thereof and the like.

Additional pH controlling agents may also be included in the ink, if desired. Examples of such pH controlling agents suitable for inks of the present invention include, but are not limited to, acids; bases, including hydroxides of alkali metals such as lithium hydroxide, sodium hydroxide and potassium hydroxide; phosphate salts; carbonate salts; carboxylate salts; sulfite salts; amine salts; amines such as diethanolamine and triethanolamine; mixtures thereof and the like. When present, the pH controlling agent is preferably included in an amount of up to about 1 percent by weight, and preferably from about 0.01 to about 1 percent by weight.

Other additives may also be added. For example, trimethylol propane may be added to the ink jet ink compositions, for example, to reduce paper curl or as an anti-cockle agent. These additives, such as trimethylol propane, generally have a solubility parameter in the range of from about 27 to about 35 MPa$^{1/2}$, and preferably between 29 and 33 MPa$^{1/2}$, and can bind to paper through hydrogen bonding. Other examples of such anti-curl agents include, but are not limited to, N-acetylethanolamine, N-N-diacetyl piperazine, triethylene glycol, N-(2-aminoethyl) ethanolamine, 1,4butanediol, N-ethyl formamide, 2-methyl-1,5-pentanediol, 1,5-pentanediol, diethylene glycol, 2,2'-oxybisethanol, mixtures thereof and the like. Preferably, the concentration of such anticurl agents in ink jets of the present invention is between about 5 and about 50% by weight and more preferably between 10 and about 30% by weight.

Other suitable additives are disclosed, for example, in U.S. Pat. No. 4,737,190 to Shimada et al., the entire disclosure of which is incorporated herein by reference.

In embodiments of the present invention, the ink composition and especially the emulsifiable dye-polymer resin contained therein are neutrally charged. Thus in embodiments, charge control agents and the like may be added (or omitted) as necessary to neutralize any charge in the ink composition that arises from the presence of other components.

In forming the final ink jet ink compositions of the present invention, certain physical properties should be satisfied. For example, ink compositions for use in ink jet recording processes should have appropriate viscosity and surface tension characteristics. In the present invention, it is preferred that the ink jet ink composition has a viscosity of from about 0.7 to about 15 cP at 25° C. More preferably, the viscosity is from about 1 to about 10 cP, and even more preferably from about 1 to about 5 cP. it is also preferred that the ink jet ink composition has a surface tension of from about 20 to about 70 dynes/cm at 25° C. More preferably, the surface tension is from about 25 to about 60 dynes/cm, and even more preferably from about 30 to about 40 dynes/cm.

A significant advantage of the present invention is that cosolvent-less inks may be formed for use in ink jet printing processes. Such ink compositions are more environmentally friendly in that they do not include solvents that are traditionally used in the formation of ink jet ink compositions. Rather, in embodiments, the present invention provides for the preparation of dissipatable polymer-colorant compositions that are dissipated in water as the only solvent to form the ink jet ink composition.

The invention will now be described in detail with reference to specific preferred embodiments thereof. All parts and percentages are by weight unless otherwise indicated.

EXAMPLE

Example 1

Preparation of a Black Sulfonated Polyester-Dye Resin

A sulfonated polyester resin-dye copolymer is prepared in a 1 L Parr reactor equipped with a magnetic stirrer, distillation apparatus, and a bottom drain valve. Into the reactor is charged 172 g dimethylterephthalate, 152 g 1,2-propanediol, 29.6 9 dimethyl 5-sulfoisophthalate sodium salt, 75 g of the black dye Reactint Black X57 ab (Available from Milliken Chem. Co), and 0.5 g dibutyl tin oxide hydroxide. The mixture is heated in the reactor to 165° C. and stirred at 200 rpm for one hour. The mixture is then raised slowly to 190° C. over a five hour period, during which time methanol is collected in the distillation receiver. The mixture is then heated to 200° C. and vacuum is applied from atmospheric pressure to 1 torr over a two hour period, during which time 1,2-propanediol is collected in the distillation receiver. 75 g 1,2-propanediol is collected during this process. The temperature is then raised slowly to 220° C., and the vacuum decreased to 0.2 torr over a one hour period. The reactor is then repressurized to atmospheric pressure, and the product is discharged through the bottom drain valve.

The sulfonated polyester resin-dye copolymer is analyzed for its glass transition temperature, which is found to be 35° C.

Example 2

Preparation of Black Ink Composition

The black sulfonated polyester resin-dye copolymer of Example 1 is used to prepare a black cosolvent-less ink. The ink composition is formed by dispersing 10% by weight of the black sulfonated polyester resin-dye copolymer of Example 1 in water. The mixture is mixed for 15 minutes at 90° C. The result is an aqueous cosolvent-less ink. The effective diameter of the colored particles is 50 nm (as found using a BI-90 particle sizer v 2.2).

The ink is then jetted onto various print media using a Hewlett Packard Deskjet Printer. The ink is jetted onto Xerox 4024 Xerographic Paper, Hammermill copier paper, and Hewlett Packard and Tektronic coated ink jet papers. All of the print media exhibit waterfast images with excellent edge acuity.

Example 3

Preparation of a Yellow Sulfonated Polyester-Dye Resin

Following the same procedure and using the same equipment as in Example 1, a yellow sulfonated polyester resin-dye copolymer is prepared. The same materials are used as in Example 1, except that the black dye is substituted with 75 g of the yellow dye Reactint Yellow (Available from Milliken Chem. Co). The sulfonated polyester resin-dye copolymer is analyzed for its glass transition temperature, which is found to be 24.5° C.

Example 4

Preparation of Yellow Ink Composition

The yellow sulfonated polyester resin-dye copolymer of Example 3 is used to prepare a yellow cosolvent-less ink. The ink composition is formed by dispersing 3% by weight of the yellow sulfonated polyester resin-dye copolymer of Example 3 in water. The mixture is mixed for 15 minutes at 90° C. The result is an aqueous cosolvent-less ink. The effective diameter of the colored particles is 70 nm (as found using a BI-90 particle sizer v 2.2).

The ink is then jetted onto various print media using a Hewlett Packard Deskjet Printer. The ink is jetted onto Xerox 4024 Xerographic Paper, Hammermill copier paper, and Hewlett Packard and Tektronic coated ink jet papers. All of the print media exhibit waterfast images with excellent edge acuity.

What is claimed is:

1. An ink for ink jet printing, comprising colored particles dispersed in a liquid vehicle, said colored particles comprising a dye chemically bonded to an emulsifiable polymer resin comprising a hydrophilic moiety, wherein said ink has a surface tension of from about 20 to about 70 dynes/cm and a viscosity of from about 0.7 to about 15 cP at 25° C.

2. The ink of claim 1, wherein said liquid vehicle comprises water.

3. The ink of claim 1, wherein said dye is a chromophore.

4. The ink of claim 1, wherein said hydrophilic group is selected from the group consisting of carboxylic acid alkali salts, phosphonate salts, ammonium halides, and alkali sulfonated groups.

5. The ink of claim 1, wherein said hydrophilic group is an alkali sulfonated group with an alkali metal counterion selected from the group consisting of sodium, calcium, lithium, potassium, cesuim, barium, magnesium, and hydrogen.

6. The ink of claim 1, wherein said hydrophilic group is contained in said polymer resin in a concentration of from about 2.5 mole percent to about 15 mole percent.

7. The ink of claim 1, wherein said polymer resin has the following formula:

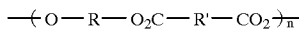

wherein R' is a mixture of from about 35 to about 47.5 mole percent of moieties selected from the group consisting of ethylene, propylene, butylene, pentylene, octylene, phenylene, ethenylene, terephthalylene, isophthalylene, cyclohexylene, bisphenolene, bis(alkyloxy) bisphenolene, thereof and mixtures thereof, and from about 2.5 to about 15 mole percent of an alkali sulfonate moiety; R is a mixture of from about 20 to about 50 mole percent of a dye chromophore, and from about 0 to about 30 mole percent of a member selected from the group consisting of an alkyl group, oxyalkylene group, bisphenylene, cyclohexylene and mixtures thereof; and n is an integer of from about 10 to about 1000.

8. The ink of claim 7, wherein said alkali sulfonate moiety is selected from the group consisting of sodium sulfonated, calcium sulfonated, and lithium sulfonated moieties of ethylene, propylene, butylene, pentylene, octylene, phenylene, terephthalylene, isophthalylene, ethenylene, cyclohexylene, bisphenolene, bis(alkyloxy) bisphenolene, and mixtures thereof.

9. The ink of claim 1, wherein said emulsifiable polymer resin comprises moieties of at least one diol and moieties of at least one diester.

10. The ink of claim 1, wherein said at least one diol is a chromophore of a dye having at least two functional hydroxy groups, represented by the following formula:

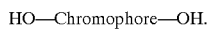

HO—Chromophore—OH.

11. The ink of claim 1, wherein said colored particles have an average diameter of from about 2 nanometers to about 500 nanometers.

12. The ink of claim 1, further comprising at least one additive selected from the group consisting of humectants, biocides, buffering agents, anti-mold agents, pH adjustment agents, electric conductivity adjustment agents, chelating agents, anti-rusting agents and anti-cockle agents.

13. The ink of claim 1, wherein said ink is prepared by a process comprising dispersing an emulsifiable dye-polymer resin in a liquid vehicle at a temperature above the glass transition temperature of said emulsifiable dye-polymer, said emulsifiable dye-polymer resin comprising a dye chemically bonded to a polymer resin.

14. The ink of claim 1, wherein said ink has a neutral electrical charge.

15. A process for preparing an ink for ink jet printing, comprising dispersing an emulsifiable dye-polymer resin in a liquid vehicle, wherein said emulsifiable dye-polymer resin comprises a dye chemically bonded to a polymer resin comprising a hydrophilic moiety, wherein said ink has a surface tension of from about 20 to about 70 dynes/cm and a viscosity of from about 0.7 to about 15 cP at 25° C.

16. The process of claim 15, wherein said dye is chemically bonded to said polymer resin by polymerizing said dye with one or more monomers.

17. An ink-jet recording process comprising ejecting ink droplets from an orifice in accordance with a recording signal to form an image on a recording medium, wherein said ink comprises colored particles of an emulsifiable dye-polymer resin dispersed in a liquid vehicle, said emulsifiable dye-polymer resin comprising a dye chemically bonded to a polymer resin, wherein said ink has a surface tension of from about 20 to about 70 dynes/cm and a viscosity of from about 0.7 to about 15 cP at 25° C.

18. An ink for ink jet printing, comprising colored particles dispersed in a liquid vehicle, said colored particles comprising a dye chemically bonded to an emulsifiable polymer resin, and wherein said ink has a surface tension of from about 20 to about 70 dynes/cm and a viscosity of from about 0.7 to about 15 cP at 25° C.

* * * * *